June 5, 1928.

G. W. CARPENTER 1,671,969

UTILIZATION OF ALTERNATING CURRENTS FOR RADIOSIGNALING

Filed Jan. 24, 1921      3 Sheets-Sheet 1

Inventor
Glenn W. Carpenter

By
Attorney

Inventor
Glenn W. Carpenter
By [signature]
Attorney

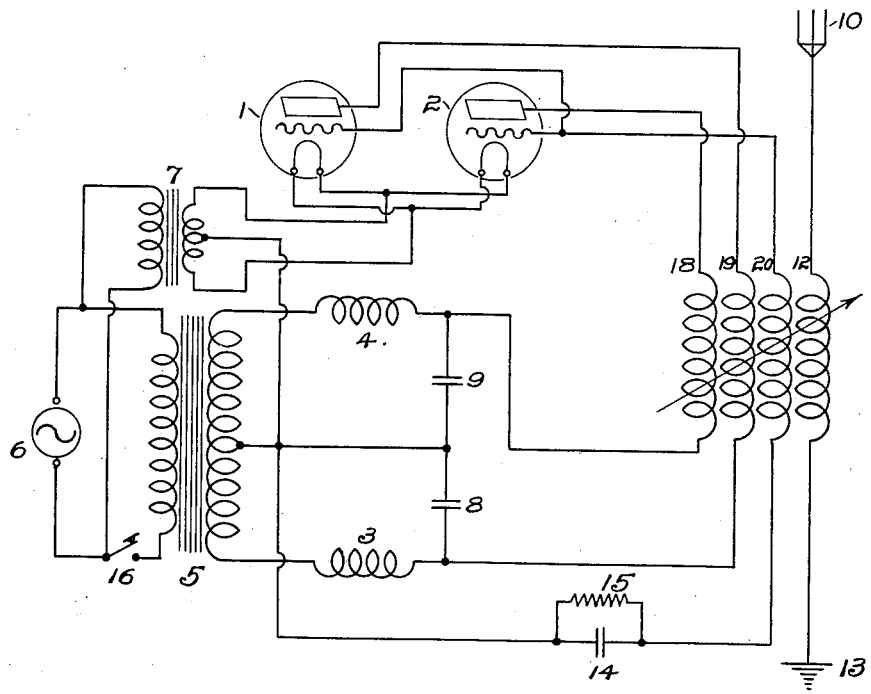

Patented June 5, 1928.

1,671,969

UNITED STATES PATENT OFFICE.

GLENN W. CARPENTER, OF WASHINGTON, DISTRICT OF COLUMBIA.

UTILIZATION OF ALTERNATING CURRENTS FOR RADIOSIGNALING.

Application filed January 24, 1921. Serial No. 439,585.

The invention relates to the utilization of alternating currents for radio signaling and an object thereof is to avoid certain disadvantages in the use of direct current for vacuum tube transmission.

In vacuum tube transmission large plate voltage is necessary for good efficiency, but it is difficult to get a high order of direct current for plates, from machines or batteries. By employing an alternating current on the plate it can be stepped up by means of a simple transformer, thus permitting use of any sort of alternating current supply as the source of energy, such as commercial lines.

Further, by employing two tubes, or one tube with two plates, the energy of a complete cycle of alternating current may be utilized, one plate operating on one half of a cycle and the other plate on the other half of the cycle.

Other objects and advantages of the invention will appear as the description proceeds.

In the drawings:—

Fig. 4 is a diagrammatic view of another modification of the system shown in Fig. 1.

Figure 1:
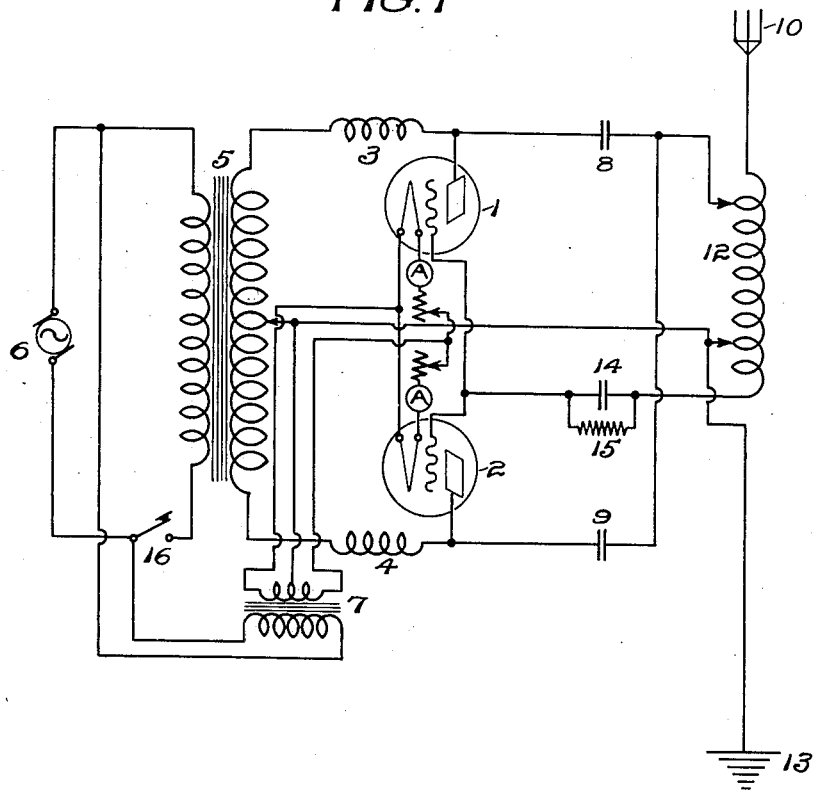
Fig. 1 is a diagrammatic view of a transmitting system employing an alternating current source as supply for the plates of two vacuum tubes.

With reference to Fig. 1, numerals 1 and 2 indicate two three-element vacuum tubes, high voltage alternating current being supplied to the plates of these tubes by means of a step-up transformer 5, which is connected to some source of alternating current supply 6. The filaments may be heated by means of a step-down transformer 7, or by any direct current supply if preferred. Obviously the transformer 7 may or may not be an integral part of the transformer 5.

Radio frequency choke coils 3 and 4 prevent the high frequency current from entering and destroying the windings of the high tension transformer 5.

The oscillatory circuit comprising the antenna 10, the coil 12, and the ground 13, is the usual circuit and is fed from the output elements of the vacuum tubes 1 and 2, through the blocking capacities 8 and 9. The grids of the tubes 1 and 2 are connected in parallel and are connected to the coil 12 at the end opposite from that fed by the plates of the tubes.

The resistance 15 provides for the necessary negative potential on the grids of the tubes 1 and 2; while capacity 14 is a radio frequency by-pass around the resistance 15.

Transmission of signals may be accomplished by opening and closing the primary of the transformer 5 or by any other well known means now used in standard vacuum tube transmitters, a key being indicated by numeral 16.

The action of the above described transmitting system is as follows:

The two tubes operate alternately, that is one operates on one half of the cycle, and the other operates on the other half of the cycle. This is due to the unilateral conductivity of the vacuum tubes, which pass current only when the plates are positive with respect to the filament; and as an alternating current is supplied to the plates they are alternatively positive and negative with respect to the filament. Each tube when operating generates radio frequency currents in the antenna, the wave form of the antenna current being shown diagrammatically in Fig. 2. The curve ABCDE represents a complete cycle of the supply voltage fed to the plates of the vacuum tubes. During this interval of time a large number of radio frequency oscillations are generated; those during the time ABC being generated by one tube, and those during the time CDE being generated by the other tube.

Figure 3:
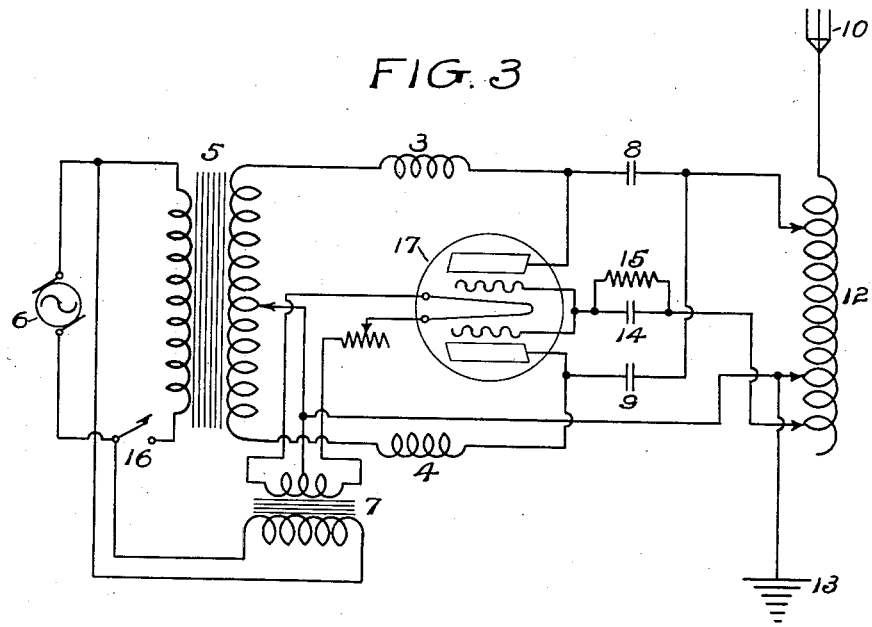
Fig. 3 is a diagrammatic view of a modification of the system shown in Fig. 1, the two systems being identical except that in the latter system a special tube is substituted combining the two tubes shown in Fig. 1.

With reference to Fig. 3, the system disclosed therein is identical with the system described above except that here I employ a special single tube 17 embodying the two tubes shown in Fig. 1. There is no difference in the operation of the two systems and hence any further description thereof is unnecessary.

The circuit disclosed in Fig. 4 is another modification of the system shown in Fig. 1, the principle involved being the same. In this circuit a coil is connected in series with each plate lead to the vacuum tubes 1 and 2, the coils being indicated by numerals 18 and 19. Both coils are coupled to the antenna 10 through the coupling coil 12, and oscillations are sustained by means of the coupling between the grid coil 20 and the plate coils 18 and 19.

Oscillations are set up in the antenna at a frequency depending on the capacity of the antenna and the inductance of coil 12.

Capacities 8 and 9 are radio frequency by-passing condensers to prevent the high frequency currents from entering and destroying the windings of the transformer 5; and coils 3 and 4 are radio frequency chokes serving the same purpose. Other parts of the circuit are similar to those already described.

It will be obvious from the description of these systems, that I am enabled to employ any sort of alternating current supply such as commercial lines, as a source of energy. It will also be clear that by employing two tubes, or one tube with two plates, the energy of a complete cycle is utilized.

It is not my intention to be limited to the specific systems shown or to any specific apparatus, as I claim broadly the method of and means for utilizing an alternating current for plate supply in vacuum tube transmission, wherein the complete cycle of the alternating current is employed.

Figure 2:
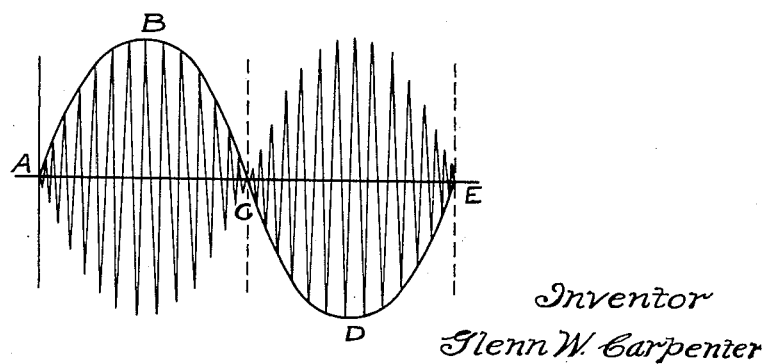
Fig. 2 is a diagrammatic representation of the wave form of the antenna current.
Figure 5:
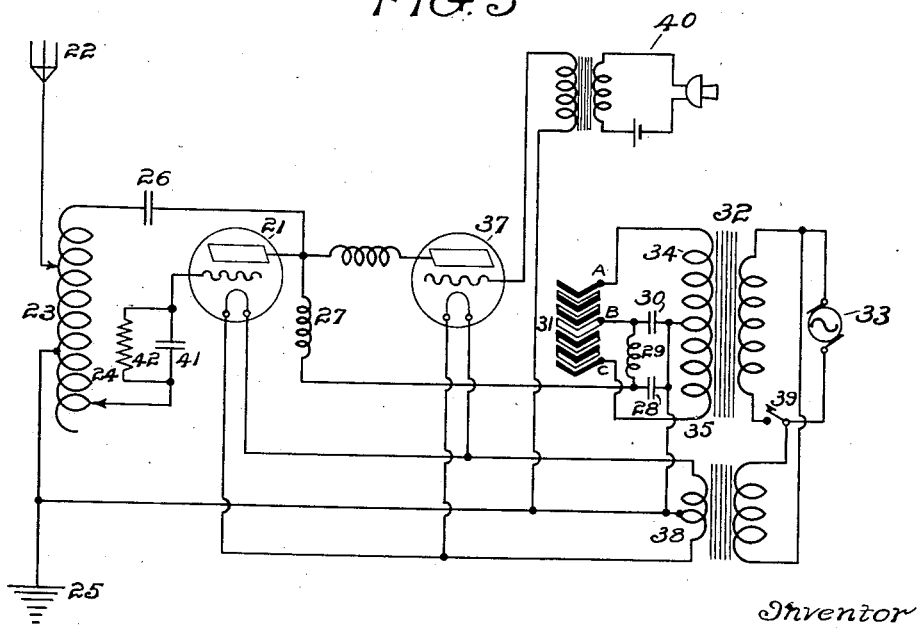
Fig. 5 is a diagrammatic view of a system for rectifying an alternating current in vacuum tube transmission.

The circuits above described supply modulated undamped radio frequency currents of the form shown in Fig. 2 to the antenna system. In order to obtain unmodulated undamped radio frequency currents in the antenna, using alternating current for the plate supply, it is necessary to rectify the alternating current and smooth out all ripples before impressing the same on the plates of the oscillating tubes. This is especially important if the circuit is to be employed as a radiophone. Fig. 5 shows a system in which this is accomplished.

A three element vacuum tube 21 is connected to an oscillating circuit 22, 23, 24, 25, oscillations being sustained by means of the coupling between grid coil 24 and plate coil 23.

The condenser 26 is the usual blocking condenser, and numeral 27 indicates a radio frequency choke coil which prevents the high frequency currents entering and destroying the filter system. It also prevents passage of the radio frequency currents from the plate to the ground through the high capacities 28 and 30.

A liquid rectifier 31 is used for rectifying the alternating current from the transformer 32. The rectifier shown consists of a series of metallic cones, each being formed of a lead and an aluminum cone welded or riveted together. The cones in the lower half of the rectifier are made with the aluminum cone riveted to the bottom of the lead one, while in the upper half the cones are made with the aluminum ones secured to the upper side of the lead ones. Two-all-lead cones serve as the outside terminals of the rectifier, and an all-aluminum cone serves as the center terminal of the rectifier.

The rectifier, per se, forms the subject matter of a separate application, Serial No. 475,840 filed June 7, 1921.

A filter circuit consisting of condensers 28 and 30 and impedance 29 is inserted in the rectifier circuit as shown to smooth out the irregularities in the voltage wave from the rectifier. The coil 29 and condenser 28 are not absolutely essential, but aid in the smoothing out. Additional steps of inductance and capacity may be added in cascade to further eliminate the irregularities.

Numeral 33 indicates any source of alternating current which is stepped up to some suitable value by the transformer 32; the ends of the high voltage coils 34 and 35 being connected with the terminals A, C, of the rectifier.

The filaments of the oscillating tube 21 and the modulating tube 37 may be heated by the low voltage coil 38 or from any other suitable source.

The resistance 42 provides for the necessary negative potential on the grid of tube 21, while the capacity 41 is a radio frequency by-pass around the resistance 42.

If this transmitter system is employed in radio telegraphy, keying is accomplished by any well known means now used in vacuum tube transmission, a key being indicated by numeral 39.

For purposes of radiotelephony an ordinary telephone transmitter sytem indicted by numeral 40 is connected with the grid of vacuum tube 37.

While for illustrative purposes I have shown a particular rectifier, it is to be understood that any other suitable type of rectifier may be substituted for that shown, and it is not my intention to be limited to the use of any particular rectifier.

The operation of the system illustrated in Fig. 5 is as follows:

Low voltage alternating current is supplied to the primary winding of the step-up transformer 32 from some source as indicated by numeral 33. The high voltage alternating current developed at the terminals of the secondary windings 34 and 35 is impressed on the terminals A, C, of the rectifier.

The two sections of the rectifier AB and CB operate alternately; that is one section allows current to flow during one half of the cycle of supply voltage, and the other section allows current to flow during the other half of the cycle. This is due to the well known unilateral conductivity of the elements in the liquid rectifier, which pass current only when the lead elements are positive with respect to the aluminum ones.

It will be seen that as the outside terminal of coil 34 becomes positive, current will flow in the direction AB in the rectifier, and back to the center tap of the high voltage secondary winding through the capacity 30. During the next half cycle of the supply voltage, section CB of the rectifier passes current while the current in AB is zero, or nearly so. Thus a pulsating direct current potential is developed across the terminals of the condenser 30. If this capacity be sufficiently large, the pulsating direct current potential is smoothed to such an extent that this source of direct current may be utilized for supplying the plates of vacuum tube transmitters.

The direct current potential obtained from the rectifier filter circuit above described, is impressed on the plate of an oscillating tube 21.

Impedance 29 and capacity 28 are additional smoothing out elements, but are not essential to the operation of the circuit.

The operation of the oscillating and modulating tube circuits connected to tubes 21 and 37 respectively, are well known in the art and need not be described herein.

Having fully described my invention what I claim as new and desire to secure by Letters Patent is:

1. In a system for generating modulated high frequency oscillations the combination of a source of low frequency alternating current for energization purposes, means for rectifying each half cycle of said alternating current, means for converting the energy of each half cycle into high frequency oscillations, means including said source of current for impressing changes of a regular periodical character on the generated high frequency, and means for preventing said high frequency oscillations from injuriously entering said source of low frequency alternating current.

2. In a system for generating modulated high frequency oscillations the combination of a source of low frequency alternating current for energization purposes, thermionic vacuum tube means for converting each half cycle of said alternating current into high frequency oscillations, means including said source of current for impressing changes of a regular periodical character on the generated high frequency, and means for preventing said high frequency oscillations from injuriously entering said source of low frequency alternating current.

3. In a system for generating modulated high frequency oscillations the combination of a source of low frequency alternating current for energization purposes, a pair of three electrode thermionic vacuum tube plate circuits oppositely supplied by said alternating current, grid circuits coupled to said plate circuits, means including said source of current for impressing changes of a regular periodical character on the generated high frequency, and means for preventing the high frequency oscillations resulting from said combination from injuriously entering said source of low frequency alternating current.

4. In a system for generating modulated high frequency oscillations the combination of a single source of low frequency alternating current for energization purposes and arranged to impress changes of amplitude of a regular periodical character on the generated high frequency, a pair of three electrode thermionic vacuum tube plate circuits oppositely excited by said alternating current, radio frequency choke coils in said plate circuits, and grid circuits coupled to said plate circuits.

5. In a system for generating modulated high frequency oscillations the combination of a source of low frequency alternating current arranged to impress changes of amplitude of a regular periodical character on the generated high frequency, a pair of three electrode thermionic vacuum tube plate circuits coupled to corresponding grid circuits, radio frequency choke coils in said plate circuits, and radio frequency by-pass condensers connected across said plate circuits.

6. In a system for generating modulated high frequency oscillations the combination of a pair of three electrode vacuum tubes having coupled plate and grid circuits, a source of low frequency alternating current oppositely connected to the plate circuits of the tubes and arranged to impress changes of amplitude of a regular periodical character on the generated high frequency, and radio frequency choke coils in said plate circuits.

7. In a system for generating modulated high frequency oscillations the combination of a pair of three electrode vacuum tubes having coupled plate and grid circuits, a source of low frequency alternating current oppositely connected to the plate circuits of the tubes and arranged to impress changes of amplitude of a regular periodical character on the generated high frequency, radio frequency choke coils in said plate circuits, and radio frequency by-pass condensers connected across said plate circuits.

8. In a system for generating modulated high frequency oscillations the combination of a pair of three electrode vacuum tubes having coupled plate and grid circuits, a source of low frequency alternating current oppositely connected to the plate circuits of the tubes and arranged to impress changes of amplitude of a regular periodical character on the generated high frequency, and means for preventing radio frequency currents from injuriously entering said source of low frequency alternating current.

GLENN W. CARPENTER.